US000001171H

United States Statutory Invention Registration [19]

[11] Reg. Number: H1171

Fillhart et al.

[43] Published: Apr. 6, 1993

[54] CARDIOID BEAMFORMER WITH NOISE REDUCTION

[75] Inventors: Ricky M. Fillhart, Doylestown; Donato M. Russo, Warrington, both of Pa.

[73] Assignee: The United States of America as represented by the Secretary of the Navy, Washington, D.C.

[21] Appl. No.: 631,584

[22] Filed: Dec. 21, 1990

[51] Int. Cl.[5] ..... G01S 3/80

[52] U.S. Cl. ..... 181/125; 367/118; 367/125; 367/129; 367/135

[58] Field of Search ..... 181/125; 367/99, 103, 367/118, 124, 125, 126, 129, 135

[56] References Cited

U.S. PATENT DOCUMENTS

| | | | |
|---|---|---|---|
| 3,860,928 | 1/1975 | Ehrlich | 367/126 |
| 3,873,958 | 3/1975 | Whitehouse | 367/123 |
| 4,170,001 | 10/1979 | Townsend | 367/120 |

*Primary Examiner*—J. Woodrow Eldred

*Attorney, Agent, or Firm*—James V. Tura; James B. Bechtel; Susan E. Verona

[57] ABSTRACT

A method is provided for detecting and localizing acoustic sources. Acoustic signals are transmitted by a sonobuoy and return signals are received. Electrical signals, corresponding to the received return signals, are multiplexed and transmitted. The transmitted signals are received by a receiver which is separated from the transmitter. The receiver applies the received signal to a demultiplexer which is separate from the the receiver. The demultiplexer demultiplexes the applied signals to provide electrical signals to the cardioid beamformer representative of the sonar return signals.

18 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CARDIOID BEAMFORMER WITH NOISE REDUCTION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates to the field of acoustic underwater listening devices and in particular to an acoustic underwater water listening device having directional and omnidirectional hydrophones for detecting and localizing acoustic sources.

2. Background Art Statement

A sonobuoy is a passive, directional device used for the purpose of detecting and localizing a target in water. A passive sonobuoy detects underwater sounds, converts them to electrical energy, and transmits to a receiving station a signal representative of the underwater sounds.

SUMMARY OF THE INVENTION

A method is provided for detecting and localizing acoustic sources. Acoustic signals transmitted in water are received by a sonobuoy. Electrical signals, corresponding to the received return signals, are multiplexed and transmitted. The transmitted signals are received by a receiver which is separated from the transmitter. The receiver applies the received signal to a demultiplexer which is separate from the the receiver. The demultiplexer demultiplexes the applied signals to provide electrical signals representative of the sonar return signals to the cardioid beamformer.

DETAILED DESCRIPTION OF THE INVENTION

Figure 1:
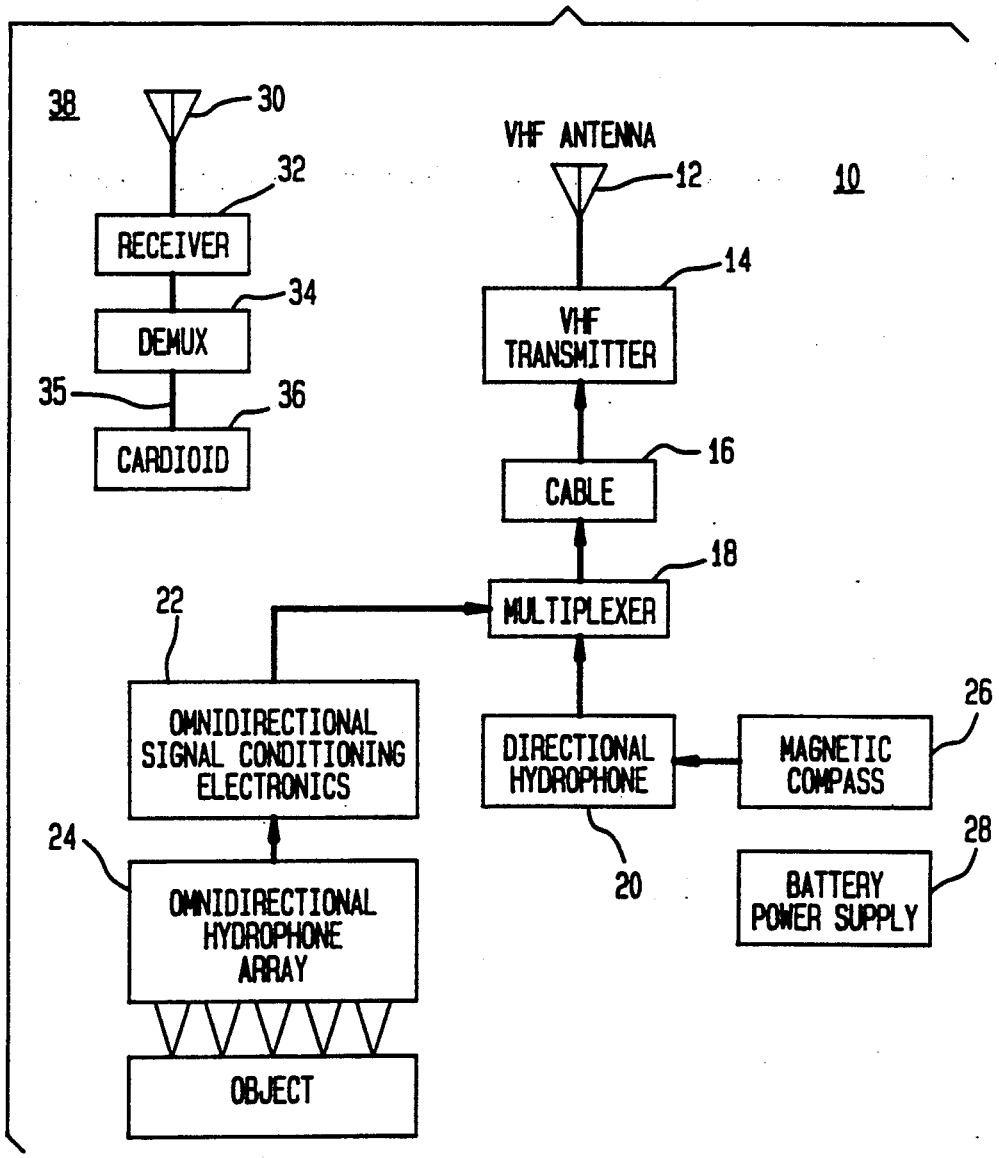
FIG. 1 shows a block diagram representation of the cardioid acoustic beamformer system of the present invention.
Figure 2A:
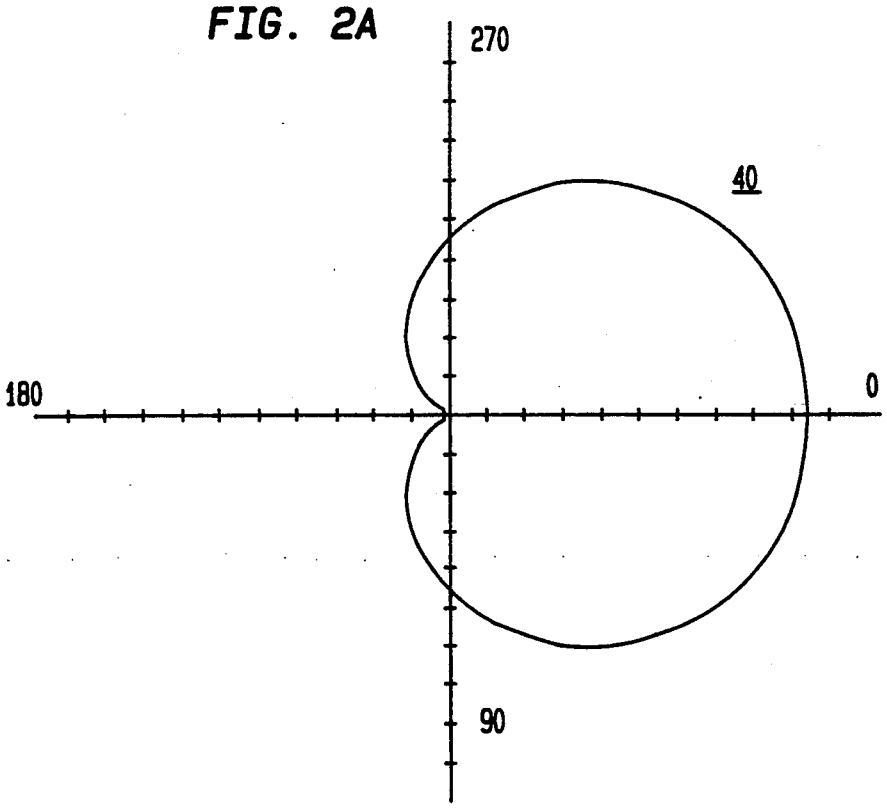
FIGS. 2*a–d* show graphical representations of polar data measured by hydrophones of a hydrophone array associated with the cardioid acoustic beamformer system of FIG. 1.
Figure 2B:
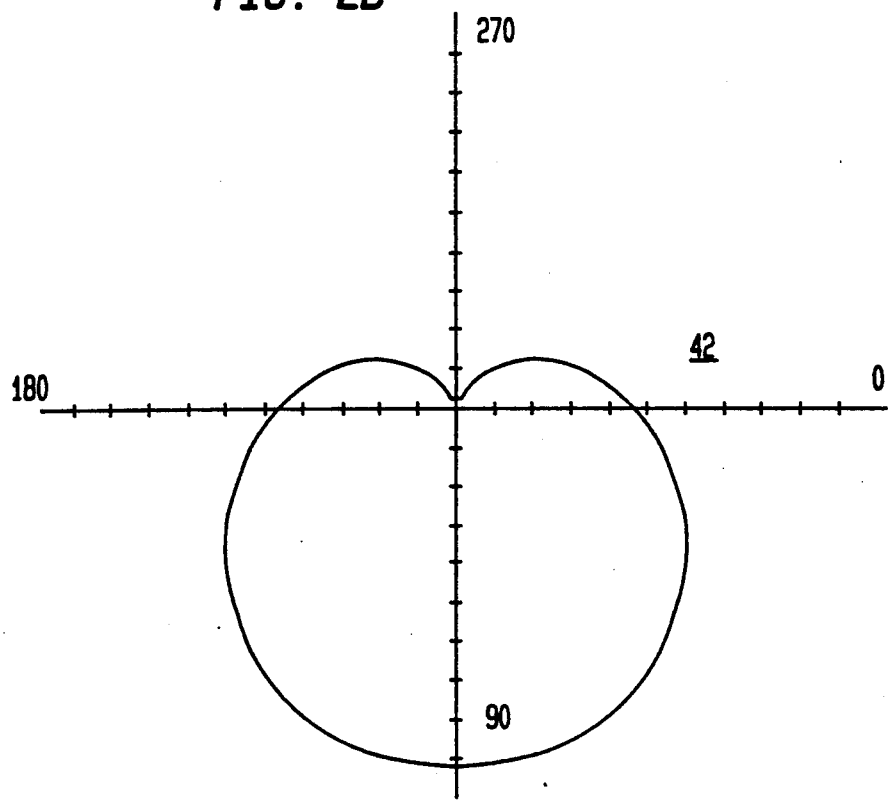
Figure 2C:
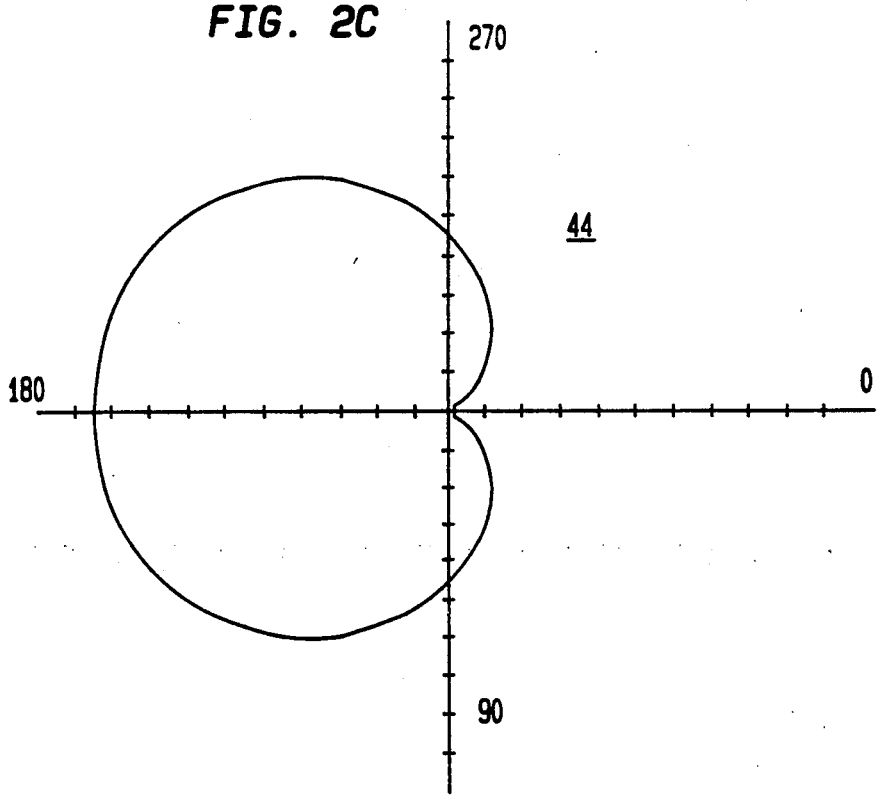
Figure 2D:
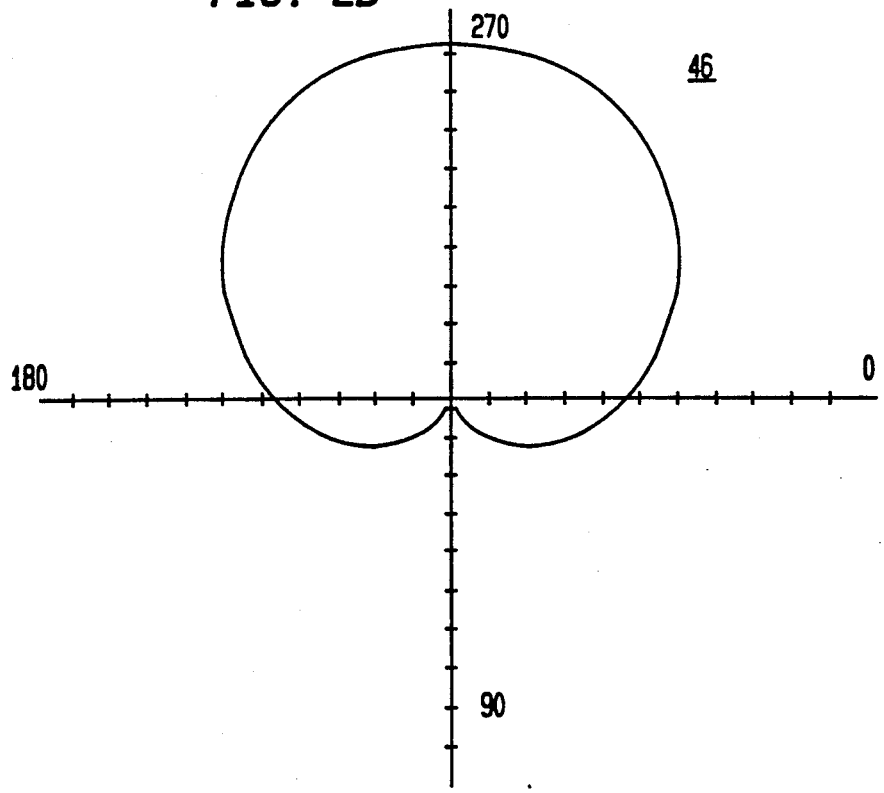

Referring now to FIG. 1, there is shown a block representation of cardioid acoustic beamformer system 36 of the present invention. Cardioid acoustic beamformer system 36 uses data from a conventional three-hydrophone array (not shown) which is arranged in a conventional manner which is well understood by those skilled in the art. One hydrophone of the three-hydrophone array is omnidirectional as shown in block 24 of system 10. The remaining two hydrophones of the three-hydrophone array of acoustic beamformer system 36 are directional as shown in block 20. Cardioid acoustic beamformer system 36 produces an output that permits computation of the bearing of an acoustic source relative to the position of the three-hydrophone array, in addition to conventional detection of the object which is the acoustic source. The bearing output of the object is provided by acoustic beamformer system 36 in combination with the three-hydrophones of the array and a magnetic compass as shown in block 26 to determine azimuth angle of the object with respect to magnetic north.

Each hydrophone of the three-hydrophone array produces its own output which is transmitted by radio frequency to receiving station 38. This data is transmitted by way of cable 16 and radio transmitter 14, having very high frequency antenna 12. The information from the three-hydrophone array is multiplexed onto single cable 16, as shown in block 18, and relayed in a multiplexed manner to receiving station 38. The received data is recorded and demultiplexed by demultiplexer 34 for analysis at receiving station 38.

Demultiplexer 34 and cardioid beamformer 36 are provided as two separate units in the system of the present invention. Thus the demultiplexed signals from demultiplexer 34 are applied to cardioid 36 by demultiplexer means 34 by way of three demultiplexed signal lines 35. The demultiplexed data of the sonobuoy applied to cardioid beamformer 36 is an electronic representation of acoustic signals received by the three-hydrophone array from all directions. The three-dimensional information is spherical in shape with the omnidirectional hydrophone at the center. The data from the two directional hydrophones enable the direction of arrival of acoustic signals to be determined using cardioid acoustic beamformer system 36.

Additionally, cardioid beamformer system 36 uses this data from the directional hydrophones of system 10 to reduce noise arriving from other directions relative to the signal direction. Demultiplexed data from the two directional hydrophones used in sonobuoy system 36 are termed COS and SIN. The COS hydrophone data is an electronic description of signals received from the north and south directions relative to sonobuoy system 10. It is representative of a dumbbell shaped volumetric figure eight shape whose axis is the north-south axis and is centered around the COS hydrophone. The SIN data received from the other directional hydrophone represents acoustic signals received from east and west directions, also in a volumetric figure eight shape with its axis aligned with the east-west axis.

A geometric cardioid is, in general, the graph of a polar equation of the forms shown in Equations (1) plotted in polar coordinates, where x is a real number. Plotted for $\theta$ from zero to three hundred sixty degrees, the following polar Equations (1) produce heart-shaped or cardioid graphs.

$$r_1 = x(1-\cos\theta) \qquad \text{Equations (1)}$$

$$r_2 = x(1+\cos\theta)$$

$$r_3 = x(1-\sin\theta)$$

$$r_4 = x(1+\sin\theta).$$

Setting x equal to unity and substituting OMNI for the number 1, COS for cos $\theta$, and SIN for sin $\theta$, polar Equations (2), of a form similar to the form of polar Equations (1), can be determined as follows:

$$r_1 = OMNI - \text{COS} \qquad \text{Equations (2)}$$

$$r_2 = OMNI + \text{COS}$$

$$r_3 = OMNI - \text{SIN}$$

$r_4 = OMNI + SIN.$

Referring now to FIGS. 2a–d, there are shown polar plots of laboratory data measured at the outputs of the cardioid acoustic beamformer system 36 for a single frequency. The polar plots of data are illustrated as graphical representations 40, 42, 44, and 46. These graphical representations correspond to three-dimensional heart shaped receiving patterns with a null in each of the cardinal headings. These shapes are mathematically expressed by Equations (2). The forms of Equations (2) are representative of the forms of Equations (1). Furthermore, using addition and subtraction circuits, Equations (2) may be realized using the outputs of cardioid acoustic beamformer system 36. Thus cardioid shaped curves may be obtained from the data provided by cardioid acoustic beamformer system 36. However, the data of cardioid acoustic beamformer system 36 is three-dimensional rather than two-dimensional as represented by Equations (2). This permits eliminating or discriminating data reception from a specified direction.

For example, if an object is at an orientation south of receiving sonobuoy system 10, cardioid beamformer system 36 may null signals which are determined to be extraneous noise from the north direction by selective orienting of the null of the heart-shaped cardioid beam pattern toward the north. It is thus possible to obtain a representation upon which to base judgment compared to only an OMNI representation. Also, by eliminating data, or null steering, from the east or west directions, it is possible to determine that an object in a more southeast or southwest direction with a higher degree of confidence.

Returning to Equations (2), the $r_1$ cardioid is termed N, the $r_2$ cardioid is termed S, the $r_3$ cardioid is termed E, and the $r_4$ cardioid is termed W. For navigational acoustic work, zero degrees is referenced to magnetic north and the cardioids obtain their directional name for bearing from the direction of the null or absence of data associated with the cardioid shape. Degree determinations, therefore, are as follows: N is zero degrees, E is ninety degrees, S is one hundred eighty degrees, and W is two hundred seventy degrees. Information from sonobuoy system 10 is demultiplexed and regenerated by electronically summing and differenciating the OMNI, COS and SIN signals to represent the analytical relationships of Equations (2) in acoustic beamformer system 36.

Figure 3:
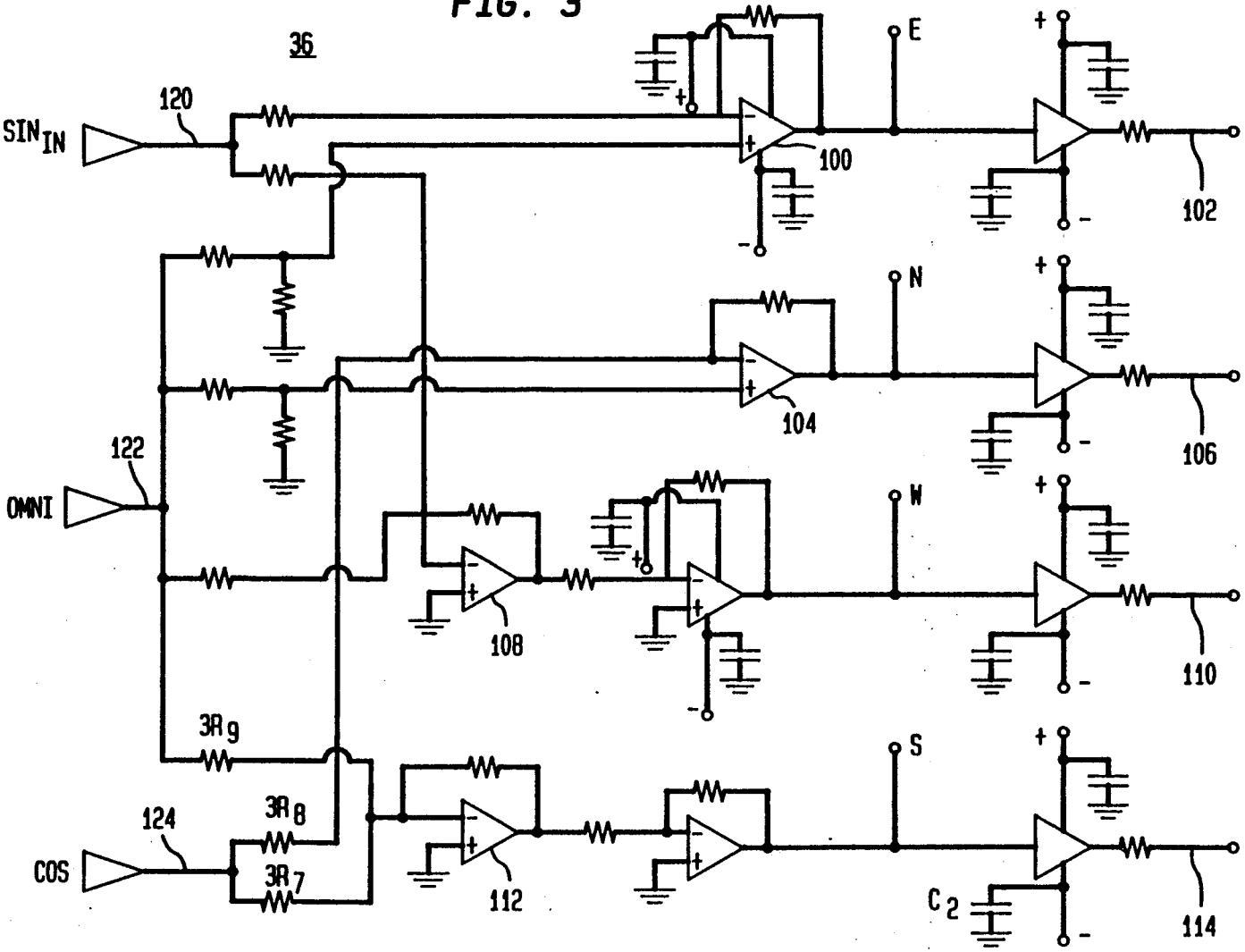
FIG. 3 shows a schematic representation of the electronic circuitry of the cardioid system of FIG. 1.

Referring now to FIG. 3, there is shown a schematic representation of the electronic circuitry of cardioid 36 which processes data transmitted from sonobuoy system 10. To electronically sum and difference the OMNI, COS and SIN signals, conventional operational amplifiers connected to form a conventional summing amplifier configuration. The output of a conventional operational amplifier connected as the first of two operational amplifiers forming the summing amplifier configuration is mathematically represented as:

$$-\frac{R_2}{R_1}(V_1 + V_2), \qquad \text{Equation (3)}$$

where $R_2$ is a feedback resister value located between the output and the inverting input terminal of the operational amplifier, $R_1$ is the input resistor value. The resistor is the same value between each voltage to be summed, $V_1$ and $V_2$, and the inverting input terminal of the first operational amplifier. The minus sign before the expression of Equation (3) indicates that the output of the first operational amplifier is one hundred eighty degrees out of phase with the input of the first operational amplifier. Such an operational amplifier is thus an inverting amplifier.

Because the first operational amplifier of the summing amplifier configuration is an inventing amplifier, the second operational amplifier of the summing amplifier configuration is also an inverting amplifier. The second operational amplifier of the summing amplifier has an output value of:

$$-\frac{R_4}{R_3} V_{IN},$$

where $V_{IN}$ is the inverted output voltage of the first summing operational amplifier. The resistance of resister $R_3$ is equal to the resistance of resister $R_4$ in order to provide unity gain in the second inventing amplifier. The second inversion provided by the second operational amplifier of the summing amplifier pair creates an output with the same phase as the summing amplifier configuration input. Making the resistance of resister $R_1$ equal to the resistances of resisters $R_2$, $R_3$, and $R_4$ permits an ideally achievable gain of unity using two operational amplifiers for this operation. The values $V_1+V_2$ of the summing amplifier configuration, from Equation (3), represent OMNI+COS, S, and OMNI+-SIN, W, values from cardioid acoustic beamformer system 36.

Similarly, two differences amplifiers may be coupled wherein the outputs are represeted by $$\frac{R_2}{R_1}(V_2 - V_1), \qquad \text{Equation (4)}$$

where $V_2-V_1$ denotes OMNI−COS, N, and OMNI−-SIN, E, values from cardioid acoustic beamformer system 10. Only one operational amplifier per difference amplifier is needed since the voltage output phase is not changed from the input. From the difference amplifier Equation (4), $R_2$ assumes the feedback resister and the pulldon resister, located from the non-inverting input to ground, are the same value. $R_1$ assumes that the input register between $V_1$ and the inverting input and the resister between $V_2$ and the non-inverting input are the same value. Thus, making $R_2$ equal $R_1$, unit gain may be achieved. All values of resisters used in the summing and differenciating circuits may be ten kiloohms.

Therefore, Equation (2) are realized using the circuitry of FIG. 3. The SIN signal is applied to input terminal 120 of cardioid 36. Similarly, the OMNI input is applied to input terminal 122 and the COS input is applied to input terminal 124. The SIN input, received by way of input terminal 120, is subtracted from the OMNI signal received by Way of input 122 in operational amplifier 100. Thus, output terminal 102 of cardioid 36 provides the OMNI-SIN of polar Equations (2).

The COS input, received by way of input terminal 124, is subtracted from the OMNI signal, received by way of input terminal 122, by differential applifier 104. Thus output terminal 106 of cardioid 36 provides the OMNI-COS term of polar Equations (2). The OMNI and SIN inputs are added in differential applifier 108. Thus output terminal 110 of cardioid 36 provides the OMNI−SIN term of polar Equation (2). The OMNI and COS inputs are added in differencial amplifier 112. Thus the OMNI+COS term of polar Equations (2) is provided at output terminal 114 of Cardioid 36.

Many modifications and variations of present invention are possible in view of the above disclosure. It is therefore to be understood, that within the scope of the appended claims, the invention may be practiced otherwise than as specifically described.

We claim:

1. A method for detecting and localizing acoustic sources, comprising the steps of:

(a) providing a plurality of first electrical signals representative of sonar signals;

(b) receiving a plurality of second electrical signals representative of sonar return signals corresponding to said first electrical signals;

(c) multiplexing said second electrical return signals;

(d) transmitting said multiplexed electrical return signals;

(e) receiving said transmitted multiplexed signals by multiplexed signal receiving means separate from said transmitting means;

(f) applying, by said multiplexed signal receiving means, said received signals to demultiplexing means for demultiplexing of said signal to provide a demultiplexed signal;

(g) applying a demultiplexed signal by signal line means, coupled to said demultiplexing means to cardioid means separated from said demultiplexing means; and, (h) processing said applied demultiplexed signal by said cardioid means to provide electrical signals representative of said sonar return signals.

2. The method for detecting and localizing acoustic sources of claim 1, wherein step (b) comprises receiving said second electrical signals by means of hydrophone means.

3. The method for detecting and localizing acoustic sources of claim 2, wherein step (b) comprises receiving said second electrical signals by means of a hydrophone array.

4. The method for detecting and localizing acoustic sources of claim 3, wherein step (b) comprises receiving said second electrical signals by means of a three-dimensional hydrophone array.

5. The method for detecting and localizing acoustic sources of claim 3, wherein at least one hydrophone of said array is an omnidirectional hydrophone.

6. The method for detecting and localizing acoustic sources of claim 5, wherein at least one hydrophone of said hydrophone array is directional.

7. The method for detecting and localizing acoustic sources of claim 6, comprising the further step of determining the direction of at least one of said sonar return signals by means of said directional hydrophone.

8. The method for detecting and localizing acoustic sources of claim 1, wherein step (i) comprises combining said demultiplexed signals.

9. The method for detecting and localizing acoustic sources of claim 8, wherein said combining of said demultiplexed signals comprises adding and substracting said demultiplexed signals.

10. A system for detecting and localizing acoustic sources, comprising;

means for providing a plurality of first electrical signals representative of sonar signals;

first means for receiving a plurality of second electrical signals representative of sonar return signals corresponding to said first electrical signals;

means for multiplexing said second electrical return signals;

means for transmitting said multiplexed electrical return signals;

second means for receiving said transmitted multiplexed signals, said first receiving means being separated from said transmitting means;

means, coupled to said first receiving means, for applying said received signals to demultiplexing means for demultiplexing of said signal to provide a demultiplexed signal;

signal line means coupled to said demultiplexing means, for applying said demultiplexed signal to cardioid means separated from said demultiplexing means; and means within said cardioid means for processing said applied demultiplexed signal by said cardioid means to provide electrical signals representative of said sonar return signals.

11. The system for detecting and localizing acoustic sources of claim 10, wherein said first means for receiving said first electrical signals comprises hydrophone means.

12. The system for detecting and localizing acoustic sources of claim 11, wherein said hydrophone means comprises a hydrophone array.

13. The system for detecting and localizing acoustic sources of claim 12, wherein said hydrophone array comprises a three-dimensional hydrophone array.

14. The system for detecting and localizing acoustic sources of claim 13, wherein at least one hydrophone of said hydrophone array comprises an omnidirectional hydrophone.

15. The system for detecting and localizing acoustic sources of claim 14, wherein at least one hydrophone of said hydrophone array is directional.

16. The system for detecting and localizing acoustic sources of claim 15, further comprising means for determining the direction of said sonar return signals by means of said directional hydrophone.

17. The system for detecting and localizing acoustic sources of claim 10, wherein said means for processing said demultiplexed signal comprises means for combining said demultiplexed signals.

18. The system for detecting and localizing acoustic sources of claim 17, wherein said means for combining said signal comprises means for adding and subtracting said signal.

* * * * *